United States Patent
Wyman et al.

(10) Patent No.: US 7,355,651 B2
(45) Date of Patent: Apr. 8, 2008

(54) METHOD AND SYSTEM FOR MINIMIZING BOTH ON-CHIP MEMORY SIZE AND PEAK DRAM BANDWIDTH REQUIREMENTS FOR MULTIFIELD DEINTERLACERS

(75) Inventors: Richard H. Wyman, Sunnyvale, CA (US); Darren Neuman, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 613 days.

(21) Appl. No.: 10/945,828

(22) Filed: Sep. 21, 2004

(65) Prior Publication Data

US 2005/0168635 A1    Aug. 4, 2005

Related U.S. Application Data

(60) Provisional application No. 60/540,980, filed on Jan. 30, 2004.

(51) Int. Cl.
*H04N 7/01* (2006.01)
(52) U.S. Cl. .................................... 348/452
(58) Field of Classification Search ................ 348/448, 348/441, 452, 458, 449, 445
See application file for complete search history.

(56) References Cited

U.S. PATENT DOCUMENTS

| 4,400,719 | A | | 8/1983 | Powers | |
|---|---|---|---|---|---|
| 6,262,773 | B1 | * | 7/2001 | Westerman | 348/448 |
| 6,288,745 | B1 | * | 9/2001 | Okuno et al. | 348/448 |
| 6,359,654 | B1 | * | 3/2002 | Glennon et al. | 348/448 |
| 7,113,221 | B2 | * | 9/2006 | Law et al. | 348/448 |
| 7,154,556 | B1 | * | 12/2006 | Wang et al. | 348/452 |
| 7,170,562 | B2 | * | 1/2007 | Yoo et al. | 348/452 |
| 2003/0112369 | A1 | * | 6/2003 | Yoo et al. | 348/448 |

FOREIGN PATENT DOCUMENTS

| EP | 0280932 A | 9/1988 |
|---|---|---|
| EP | 0662767 A | 7/1995 |

OTHER PUBLICATIONS

De Haan G et al: << Deinterlacing—An Overview >>, Proceedings of the IEEE, IEEE New York, USA, vol. 86 No. 9, Sep. 1998, pp. 1839-1857, XP000850198, ISSN: 0018-9219.

* cited by examiner

*Primary Examiner*—Paulos M. Natnael
(74) *Attorney, Agent, or Firm*—McAndrews, Held & Malloy, Ltd.

(57) ABSTRACT

In a video system, a method and system for minimizing both on-chip memory size and peak DRAM bandwidth requirements for multi-field deinterlacers are provided. Present line pixels and absent line pixels may be determined and may be ordered into upper line pixels and lower line pixels based on whether an interlaced output frame is top field or bottom field originated. Upper line pixels may be buffered in an upper line FIFO that may hold half a video line and lower line pixels may be buffered in an lower line FIFO that may hold a video line. A source switch and a line length counter may be used to assemble the deinterlaced output frame by selecting from the buffered upper line pixels and the buffered lower line pixels. The deinterlaced output frame may be buffered in an output FIFO.

33 Claims, 8 Drawing Sheets

METHOD AND SYSTEM FOR MINIMIZING BOTH ON-CHIP MEMORY SIZE AND PEAK DRAM BANDWIDTH REQUIREMENTS FOR MULTIFIELD DEINTERLACERS

CROSS-REFERENCE TO RELATED APPLICATIONS/INCORPORATION BY REFERENCE

This patent application makes reference to, claims priority to and claims benefit from U.S. Provisional Patent Application Ser. No. 60/540,980 filed on Jan. 30, 2004.

This application makes reference to:
U.S. application Ser. No. 10/945,769 filed Sep. 21, 2004;
U.S. application Ser. No. 10/875,422 filed Jun. 24, 2004;
U.S. application Ser. No. 10/945,619 filed Sep. 21, 2004;
U.S. application Ser. No. 10/945,587 filed Sep. 21, 2004;
U.S. application Ser. No. 10/871,758 filed Jun. 17, 2004;
U.S. application Ser. No. 10/945,796 filed Sep. 21, 2004;
U.S. application Ser. No. 10/945,817 filed Sep. 21, 2004;
U.S. application Ser. No. 10/945,729 filed Sep. 21, 2004;
U.S. application Ser. No. 10/946,152 filed Sep. 21, 2004;
U.S. application Ser. No. 10/871,649 filed Jun. 17, 2004;
U.S. application Ser. No. 10/946,153 filed Sep. 21, 2004; and
U.S. application Ser. No. 10/945,645 filed Sep. 21, 2004.

The above referenced applications are hereby incorporated herein by reference in their entirety.

FIELD OF THE INVENTION

Certain embodiments of the invention relate to processing of video signals. More specifically, certain embodiments of the invention relate to a method and system for minimizing on-chip memory size and peak DRAM bandwidth requirements for multi-field deinterlacers.

BACKGROUND OF THE INVENTION

In video system applications, a picture is displayed on a television or a computer screen by scanning an electrical signal horizontally across the screen one line at a time using a scanning circuit. The amplitude of the signal at any one point on the line represents the brightness level at that point on the screen. When a horizontal line scan is completed, the scanning circuit is notified to retrace to the left edge of the screen and start scanning the next line provided by the electrical signal. Starting at the top of the screen, all the lines to be displayed are scanned by the scanning circuit in this manner. A frame contains all the elements of a picture. The frame contains the information of the lines that make up the image or picture and the associated synchronization signals that allow the scanning circuit to trace the lines from left to right and from top to bottom.

There may be two different types of picture or image scanning in a video system. For some television signals, the scanning may be interlaced, while for some computer or TV signals the scanning may be progressive or non-interlaced. Interlaced video occurs when each frame is divided into two separate sub-pictures or fields. These fields may have originated at the same time or at subsequent time instances. The interlaced picture may be produced by first scanning the horizontal lines for the first field and then retracing to the top of the screen and then scanning the horizontal lines for the second field. The progressive, or non-interlaced, video may be produced by scanning all of the horizontal lines of a frame in one pass from top to bottom.

In video compression, communication, decompression, and display, there has been for many years problems associated with supporting both interlaced content and interlaced displays along with progressive content and progressive displays. Many advanced video systems support either interlaced or progressive video but not both. As a result, deinterlacers, devices or systems that convert interlaced video into progressive video, have become an important component in many video systems. The deinterlacer may take the available lines from a current field and may determine the remaining lines needed to fill the progressive output frame. The process of deinterlacing may be seen as taking one present line of pixels from the source field and producing two output lines of pixels. One line is the line that came from the source field and may be called the "present" line, while the other line is the line that needs to be created and may be called the "absent" line. Interlaced fields may be of two types, top fields and bottom fields. Top fields may have a present line as their first line and bottom fields may have an absent line as their first line. The sequence of fields in interlaced video alternate between top fields and bottom fields.

The input to a deinterlacer may require buffering in a memory device, for example, a DRAM, since the output of the deinterlacer may be continuous even when its input may be active for a current line and then inactive for a next line. Although the deinterlacer utilizes the same average DRAM access bandwidth when its input is active for every other line, as well as when its input is continuously active, the peak DRAM access bandwidth when the input is active for every other line may be doubled. This may require that twice the DRAM bandwidth be reserved for accessing buffered input. Moreover, since the average output pixel rate is twice the average input pixel rate, the classical or conventional approach to the buffering requirement would be to add a buffer, for example, a FIFO, at the input. In the case of a multi-field deinterlacer, there may be many field stores that may be read in parallel and a FIFO may be required for each of those parallel inputs. Accordingly, adding a FIFO at each input may be expensive to implement, especially on-chip where real estate is a premium.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for video signal processing. Aspects of the method may comprise buffering a plurality of upper line pixels and a plurality of lower line pixels. The buffered upper line pixels and lower line pixels may be ordered to generate a deinterlaced output frame. The upper line pixels may be buffered for a half video line while the lower line pixels may be buffered for a video line.

Generated present line pixels may be transferred to lower line pixels and generated absent line pixels may be transferred to upper line pixels when the deinterlaced output frame is originated from a bottom field. Generated present line pixels may be transferred to upper line pixels and generated absent line pixels may be transferred to lower line pixels when the deinterlaced output frame is originated from a top field. The deinterlaced output frame may be generated by alternatively selecting between N of the buffered upper line pixels and N of the buffered lower line pixels, where N corresponds to a line length of the deinterlaced output frame.

Another embodiment of the invention may provide a machine-readable storage, having stored thereon, a computer program having at least one code section executable by a machine, thereby causing the machine to perform the steps as described above for video signal processing.

Aspects of the system may comprise a pixel processor that buffers a plurality of upper line pixels and a plurality of lower line pixels. The pixel processor may be used to orders the buffered upper line pixels and buffered lower line pixels to generate a deinterlaced output frame. The pixel processor may comprise a pixel computation that generates present line pixels and absent line pixels. These present line pixels and absent line pixels may be generated after cross-chrominance removal.

The pixel computation may transfer the present line pixels to the lower line pixels and the absent line pixels to the upper line pixels when the deinterlaced output frame is originated from a bottom field. When the deinterlaced output frame originates from a top field, the pixel computation may transfer the present line pixels to the upper line pixels and the absent line pixels to the lower line pixels.

The pixel processor may also comprise a line reorder. The line reorder may comprise an upper line FIFO, a lower line FIFO, a source switch, and a line length counter. The upper line FIFO may buffer the upper line pixels for a half video line and the lower line FIFO may buffer the lower line pixels for a video line. The source switch may select N of the buffered upper line pixels or N of the buffered lower line pixels, where N corresponds to a line length of said deinterlaced output frame and where the line length counter may count the N pixels selected by the source switch. The line reorder may generate the deinterlaced output frame by alternatively selecting between N of the buffered upper line pixels and N the buffered lower line pixels.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for minimizing on-chip memory size and peak DRAM bandwidth requirements for a multi-field deinterlacer. Certain aspects of the invention may comprise buffering a deinterlaced output frame after cross-chrominance removal. A plurality of buffered upper line pixels and a plurality of buffered lower line pixels may be utilized to assemble a deinterlaced output frame. By buffering the output of the multi-field deinterlacer, it may be possible to reduce on-chip memory and peak DRAM bandwidth requirements while providing a continuous output even when the input is active for every other line.

Figure 1:
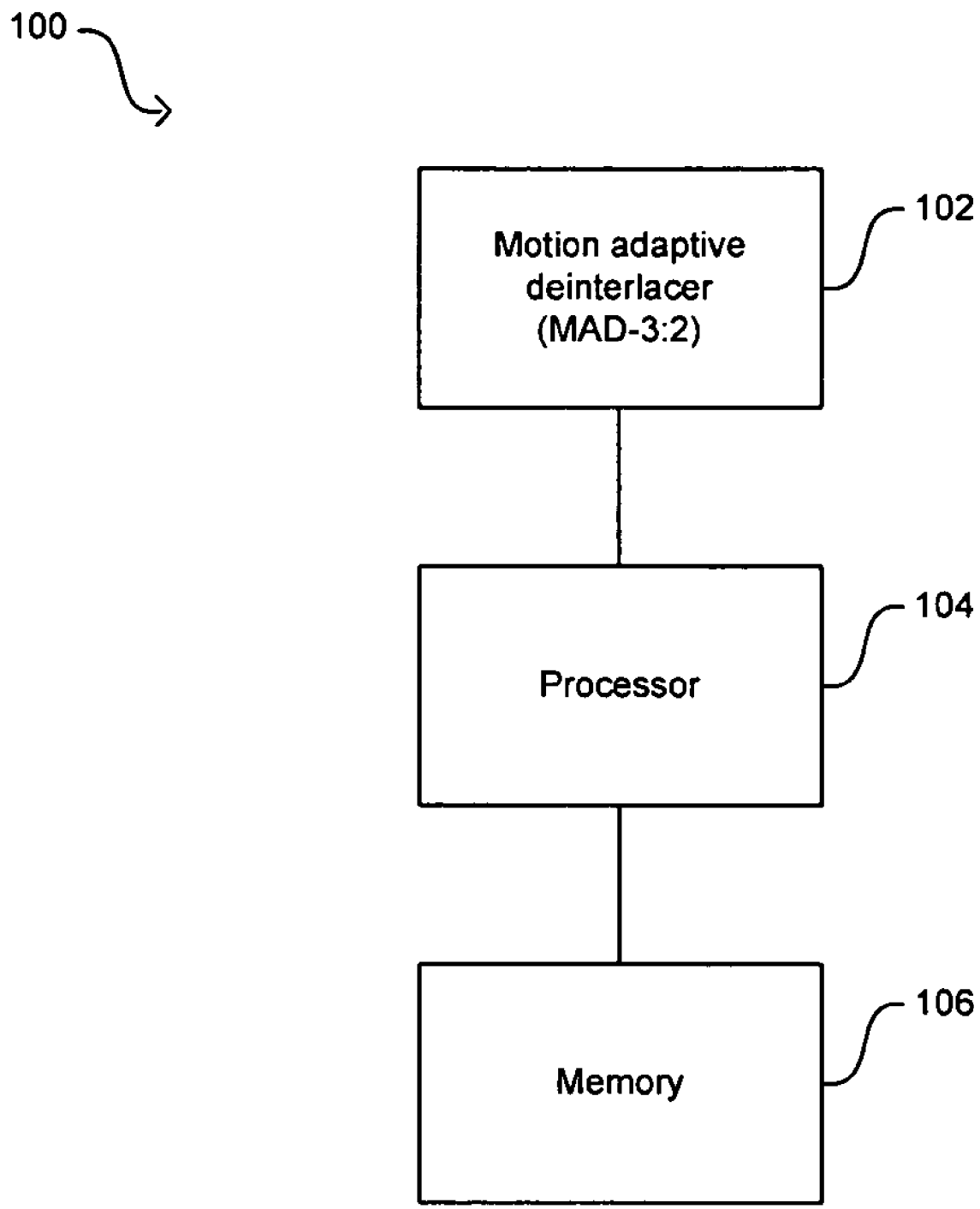
FIG. 1 illustrates a block diagram of an exemplary system for controlling a multi-field deinterlacer, in accordance with an embodiment of the invention.

FIG. 1 illustrates a block diagram of an exemplary system for controlling a multi-field deinterlacer including providing visually pleasing startup and shutdown, in accordance with an embodiment of the invention. Referring to FIG. 1, the deinterlacer system 100 may comprise a motion adaptive deinterlacer, such as a motion adaptive deinterlacer with reverse 3:2 pulldown (MAD-3:2) 102, a processor 104, and a memory 106. The MAD-3:2 102 may comprise suitable logic, code, and/or circuitry that may be adapted to deinterlace video fields. The processor 104 may comprise suitable logic, code, and/or circuitry that may be adapted to control the operation of the MAD-3:2 102, to perform the operation of the MAD-3:2 102, and/or to transfer control information and/or data to and from the memory 106. The memory 106 may comprise suitable logic, code, and/or circuitry that may be adapted to store control information, data, information regarding current video fields, and/or information regarding prior video fields.

The MAD-3:2 102 may be capable of reverse 3:2 pull-down and 3:2 pull-down cadence detection which may be utilized in a video network (VN). The MAD-3:2 102 may be adapted to acquire interlaced video fields from one of a plurality of video sources in the video network and convert the acquired interlaced video fields into progressive frames, at double the display rate, in a visually pleasing manner.

The MAD-3:2 102 may be adapted to accept interlaced video input from a video bus (VB) and output deinterlaced, progressive video to the video bus (BUS) utilized by the video network. The MAD-3:2 102 may accept up to, for example, 720×480i and produce, for example, 720×480p in the case of NTSC. For PAL, the motion adaptive deinterlacer (MAD) may accept, for example, 720×576i and produce, for example, 720×576p. Horizontal resolution may be allowed to change on a field by field basis up to, for example, a width of 720. The MAD-3:2 102 may be adapted to smoothly blend various approximations for the missing pixels to prevent visible contours produced by changing decisions. A plurality of fields of video may be utilized to determine motion. For example, in an embodiment of the invention, five fields of video may be utilized to determine motion.

The MAD-3:2 102 may produce stable non-jittery video with reduced risk of visual artifacts due to motion being misinterpreted while also providing improved still frame performance. The MAD-3:2 102 may also provide additional fields per field type of quantized motion information which may be selectable in order to reduce the risk of misinterpretation. For example, up to three (3) additional fields or more, per field type, of quantized motion information may optionally be selected in order to reduce risk of misinterpreted motion even further. This may provide a total historical motion window of up to, for example, 10 fields in a cost effective manner. Integrated cross-chrominance removal functionality may be provided, which may aid in mitigating or eliminating NTSC comb artifacts. A directional compass filtering may also be provided that reduces or eliminates jaggies in moving diagonal edges. The MAD-3:2 102 may provide reverse 3:2 pull-down for improved quality from film based sources. The MAD-3:2 102 may also be adapted to support a variety of sources.

In operation, the MAD-3:2 102 may receive interlaced fields and may convert those deinterlaced fields into progressive frames, at double the display rate. A portion of the information regarding fields that occurred prior to the current field being deinterlaced may be stored locally in the MAD-3:2. A portion of the information regarding fields that occurred after the current field being deinterlaced may also be stored locally in the MAD-3:2. A remaining portion of the information regarding fields that occurred prior to and after the current field may be stored in the memory 106.

The processor 104 may control the operation of the MAD-3:2 102. For example, the processor 104 may select from a plurality of deinterlacing algorithms, a deinterlacing algorithm that may be utilized by the MAD-3:2 102. The processor 104 may be adapted to modify the MAD-3:2 102 based on a corresponding source of the video fields. Moreover, the processor 104 may transfer to the MAD-3:2 102, information stored in the memory 106. The processor 104 may also transfer to the memory 106, any field-related information not locally stored in the MAD-3:2 102. The MAD-3:2 102 may then use information from the current field, information from previously occurring fields, and information from fields that occurred after the current field, to construct a pixel constellation and determine a current motion for the output pixel under consideration based on the information in the pixel constellation. A value for the output pixel may be determined based on the current motion and on at least one historical motion value determined for a previous field, where the historical motion may be quantized to reduce storage.

Figure 2:
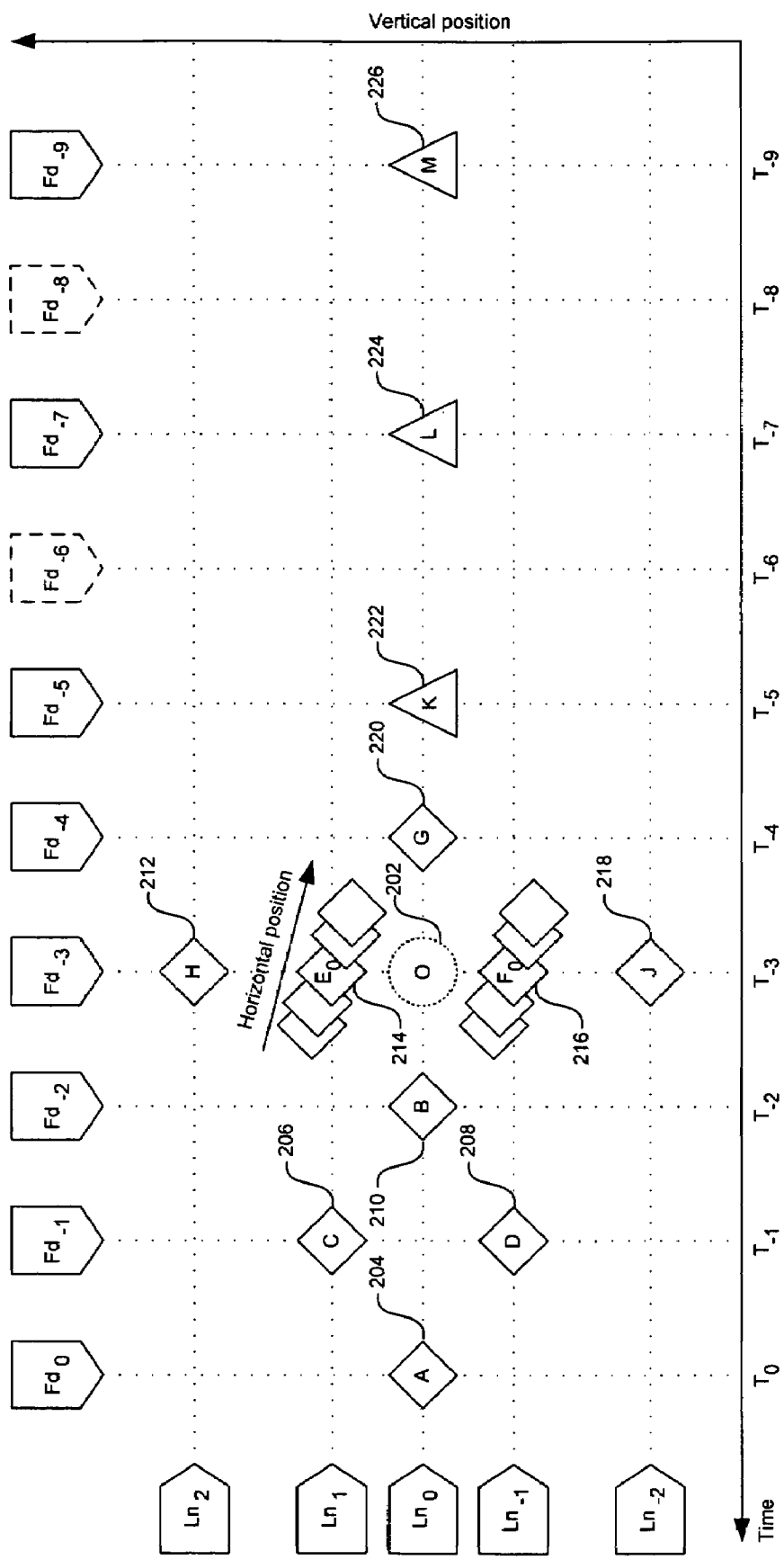
FIG. 2 illustrates an exemplary pixel constellation with locations for quantized historical motion values, in accordance with an embodiment of the present invention.

FIG. 2 illustrates an exemplary pixel constellation with locations for quantized historical motion values, in accordance with an embodiment of the present invention. Referring to FIG. 2, the pixel constellation used by the MAD-3:2 102 to determine the motion-adapted value of the output pixel may comprise a pixel (A) 204 in present line $Ln_0$ of field $Fd_0$, a pixel (C) 206 in present line $Ln_1$ of field $Fd_{-1}$, a pixel (D) 208 in present line $Ln_{-1}$ of field $Fd_{-1}$, a pixel (B) 210 in present line $Ln_0$ of field $Fd_{-2}$, a pixel (H) 212 in present line $Ln_2$ of field $Fd_{-3}$, a pixel ($E_0$) 214 in present line $Ln_1$ of field $Fd_{-3}$, a pixel ($F_0$) 216 in present line $Ln_{-1}$ of field $Fd_{-3}$, a pixel (J) 218 in present line $Ln_{-2}$ of field $Fd_{-3}$, an output pixel (O) 202 in absent line $Ln_0$ of field $Fd_{-3}$, a pixel (G) 220 in present line $Ln_0$ of field $Fd_4$, a quantized historical motion value K 222 in field $Fd_{-5}$, a quantized historical motion value L 224 in field $Fd_{-7}$, and a quantized historical motion value M 226 in field $Fd_{-9}$. With reference to FIG. 2, time $T_0$ is shown on the left and fields to the right of $T_0$ are back in time from reference point $T_0$.

The gaps in historical motion information at $Fd_{-6}$ and $Fd_{-8}$ are due to the inclusion of historical motion information from fields of the same field type, whether top or bottom fields, as the current field. The choice to use quantized motion allows for an increased range in time of fields, with minimal cost in gates or bandwidth. The benefit of this increased range in time fields being improved deinterlacing quality in the MAD-3:2 102 due to a reduced occurrence of motion aliasing.

Figure 3:
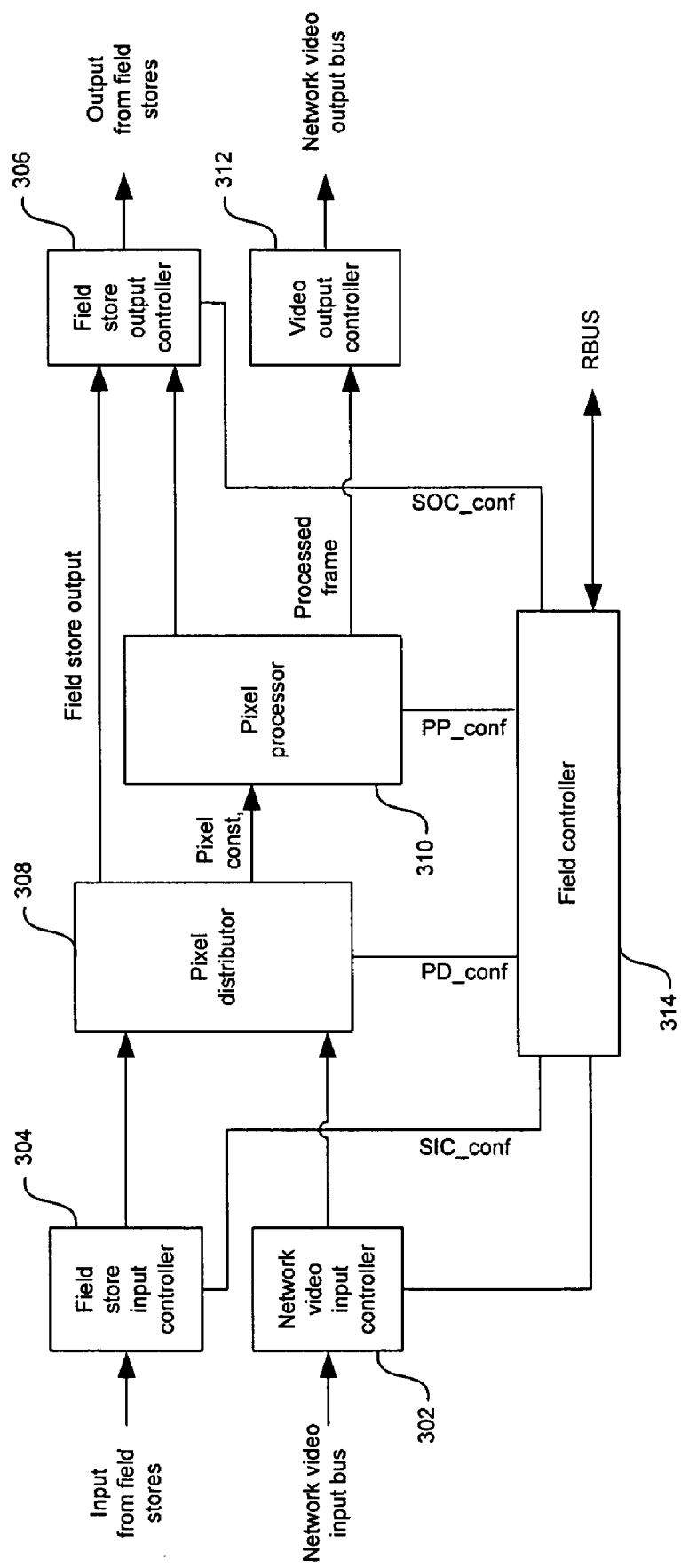
FIG. 3 illustrates a high level block diagram of a motion adaptive deinterlacer, in accordance with an embodiment of the invention.

FIG. 3 illustrates a high level block diagram of a motion adaptive deinterlacer, in accordance with an embodiment of the invention. Referring to FIG. 3, the MAD-3:2 102 in FIG. 1 may comprise a network video input controller 302, a field store input controller 304, a field store output controller 306, a pixel distributor 308, a pixel processor 310, a video output controller 312, and a field controller 314. The network video input controller 302 may comprise suitable logic, code, and/or circuitry that may be adapted to receive input from a network video input bus, to potentially scale up horizontally, and to provide a network feed A to the pixel distributor 308.

The field store input controller 304 may comprise suitable logic, code, and/or circuitry that may be adapted to manage fetching of pixel information and quantized historical motion information. The field store output controller 312 may comprise suitable logic, code, and/or circuitry that may be adapted to manage storage of pixel information and quantized historical motion information. The pixel distributor 308 may comprise suitable logic, code, and/or circuitry that may be adapted to accept pixel information and quantized historical motion information from the field store input controller 304 and from the network video input controller 302 and provide the constellation of pixels described in FIG. 2 to the pixel processor 310.

The video output controller 312 may comprise suitable logic, code, and/or circuitry that may be adapted to prepare the processed frame for transmission as a progressive or deinterlaced output over a network video output bus. The field controller 314 may comprise suitable logic, code, and/or circuitry that may be adapted to manage the transfer of pixel and quantized historical motion information and to modify and update registers used to manage the transfer of pixel and quantized historical motion information. The field controller 314 may transfer data and/or control information to the processor 104 and/or the memory 106 through the RBUS bus. The pixel processor 310 may comprise suitable logic, code, and/or circuitry that may be adapted to convert from linear array of pixels to a raster or processed frame format.

Figure 4:
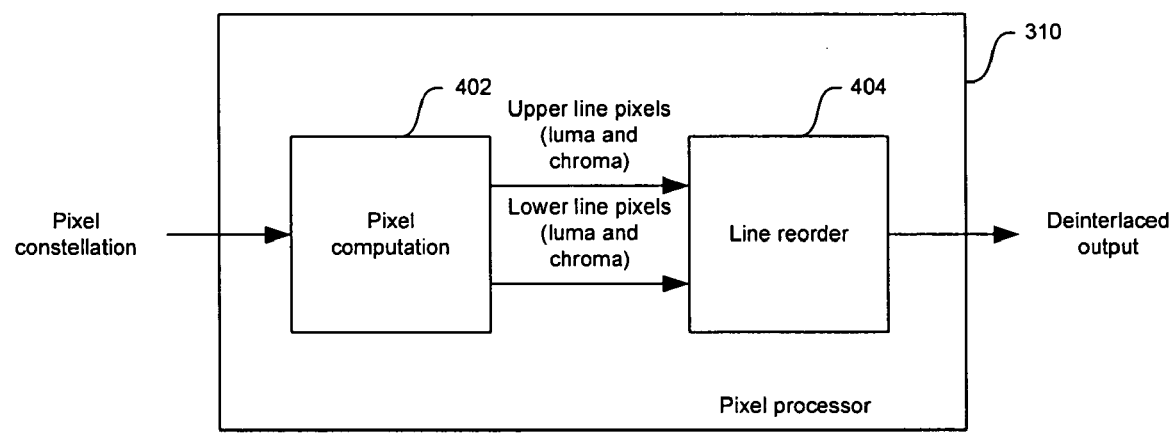
FIG. 4 is a block diagram of an exemplary pixel processor that may be utilized with a multi-field deinterlacer, in accordance with an embodiment of the invention.

FIG. 4 is a block diagram of an exemplary pixel processor that may be utilized with a multi-field deinterlacer, in accordance with an embodiment of the invention. Referring to FIG. 4, the pixel processor 310 may comprise a pixel computation 402 and a line reorder 404. The pixel computation 402 may comprise suitable logic, code, and/or circuitry that may be adapted to produce two lines of output pixels, present line pixels and absent line pixels, from the information in the pixel constellation, upper level control signals, and calculations it performs. The pixel computation 402 may transfer the present line pixels and the absent line pixels to the line reorder 404. The pixel computation 402 may comprise a plurality of computation pipelines.

The line reorder 404 may comprise suitable logic, code, and/or circuitry that may be adapted to take two vertically adjacent pixels at, for example, 480 interlaced (480i) rate from the pixel computation 402 and buffer them so that two lines may be output sequentially at, for example, 480 progressive (480p) rate. The line reorder 404 may not be limited to 480i to 480p rate conversion but may be programmable and may be adapted for use with a plurality of rate conversions.

Figure 5:
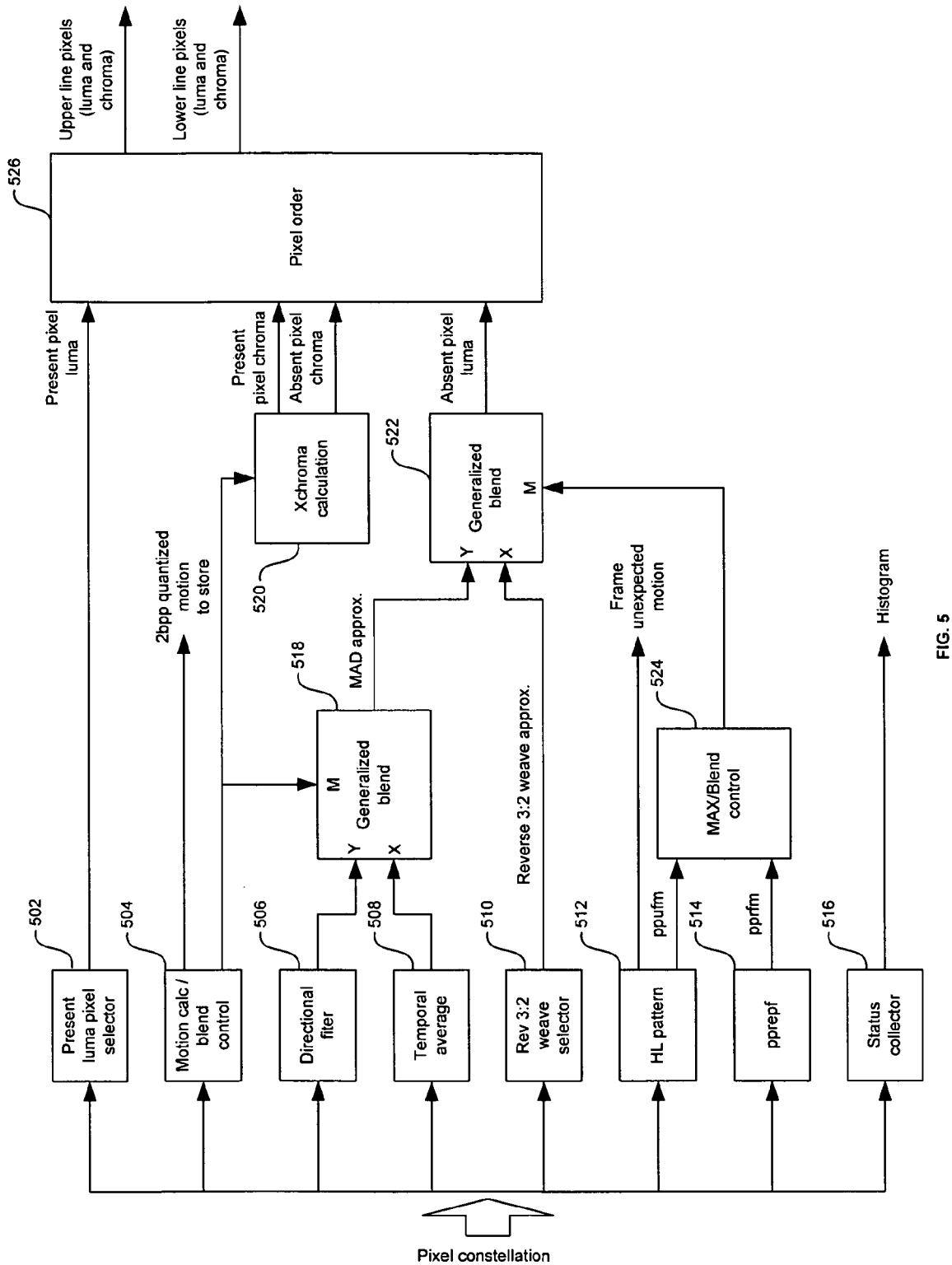
FIG. 5 is a block diagram of an exemplary pixel computation that may be utilized with a multi-field deinterlacer, in accordance with an embodiment of the invention.

FIG. 5 is a block diagram of an exemplary pixel computation that may be utilized with a multi-field deinterlacer, in accordance with an embodiment of the invention. Referring to FIG. 5, the pixel computation 402 may comprise a present luma pixel selector block 502, a motion calculation and blend control block 504, a directional filter block 506, a temporal average block 508, a reverse 3:2 weave selector block 510, an HL pattern block 512, a per-pixel repeat field motion (ppref) block 514, a status collector block 516, a generalized blend block 518, an xchroma calculation block 520, a generalized blend block 522, a MAX/blend control block 524, and a pixel order block 526.

The present luma pixel selector block 502 may comprise suitable logic, code, and/or circuitry that may be adapted to select the luma pixel from the present line of pixels. When the input field is a top field, this pixel is pixel $E_O$ 214. When the input field is a bottom field, this pixel is pixel $F_O$ 216. The motion calculation and blend control block 504 may comprise suitable logic, code, and/or circuitry that may be adapted to calculate a current motion, a historical motion, and a final motion for the output pixel O 202. The motion calculation and blend control block 504 may also produce a quantized motion value that may be stored. The motion calculation and blend control block 504 may be forced to provide a spatial approximation and therefore provide an output of, for example, 255 in an 8-bit system. This output may ensure that the blends that use the luma motion will see a very large motion and hence produce a spatial approximation in their output.

The directional filter 506 may comprise suitable logic, code, and/or circuitry that may be adapted to perform the spatial approximation that may predominate at the output of a blend operation, when large amounts of motion are measured. The temporal average block 508 may comprise suitable logic, code, and/or circuitry that may be adapted to perform the temporal average that may predominate at the output of a blend operation, when small amounts of motion are measured. The reverse 3:2 weave selector block 510 may comprise suitable logic, code, and/or circuitry that may be adapted to provide a reverse 3:2 estimate for the pixel. The reverse 3:2 weave selector block 510 may comprise a plurality of values, for example, OFF, FWD, BWD, and AVG. In an exemplary enhancement of the invention, when the value is FWD, the output of the reverse 3:2 weave selector block 510 is the luma for pixel B 210. When the value is BWD, the output is the luma for pixel G 220. For a value of AVG, the output is the linear average luma of pixel B 210 and pixel G 220. When the value is OFF, any output may be provided since the MAX/blend control block 524 may ensure that this value does not affect the output. The value of the reverse 3:2 weave selector block 510 may be determined by the field controller, 314 of FIG. 3.

The HL pattern block 512 may comprise suitable logic, code, and/or circuitry that may be adapted to implement a plurality of operations to determine a per-pixel unexpected field motion (ppufm) and may also have summing registers to produce a frame unexpected motion value that may be used in bad edit detection. The pprepf block 514 may comprise suitable logic, code, and/or circuitry that may be adapted to implement a plurality of operations to determine a per-pixel repeat field motion (pprfm) from a per-pixel repeat field difference (pprfd) and a per-pixel repeat field threshold (pprf_thresh).

The status collector block 516 may comprise suitable logic, code, and/or circuitry that may be adapted to sum the field difference and to place the results into a histogram table. The values of the histogram table may be used by the MAD-3:2 102 to determine where a repeat field has occurred. The status collector 516 may contain a plurality of registers which may be set or reset at the start of a new video field. The various levels of the histogram may correspond to the information stored in the registers.

The generalized blend blocks 518, 522 may comprise suitable logic, code, and/or circuitry that may be adapted to blend between a spatial approximation and a temporal approximation of the motion in the output pixel O 202. The MAX/Blend control block 524 may comprise suitable logic, code, and/or circuitry that may be adapted to produce a motion value that may control a final merge between the MAD approximation from the generalized blend block 518 and the reverse 3:2 weave approximation from the reverse 3:2 weave selector block 510. During normal operation, for example, the maximum of the two signals may be utilized to control the strength of the blend in the generalized blend block 522.

The pixel order block 526 may comprise suitable logic, code, and/or circuitry that may be adapted to order the luma and chroma from the present pixels and the luma and chroma from the absent pixels into the luma and chroma for the upper line pixels and the luma and chroma for the lower line pixels. When the input field is top field originated, the present pixels correspond to the upper line pixels and the absent pixels correspond to the lower line pixels. When the input field is bottom field originated, the present pixels correspond to the lower line pixels and the absent pixels correspond to the upper line pixels. The pixel order block 526 may also be utilized to provide a constant color during a hard start mode of operation instead of providing a freeze frame hard start. U.S. patent application Ser. No. 10/945,729 discloses a hard start and is herby incorporated herein by reference in its entirety.

Figure 6A:
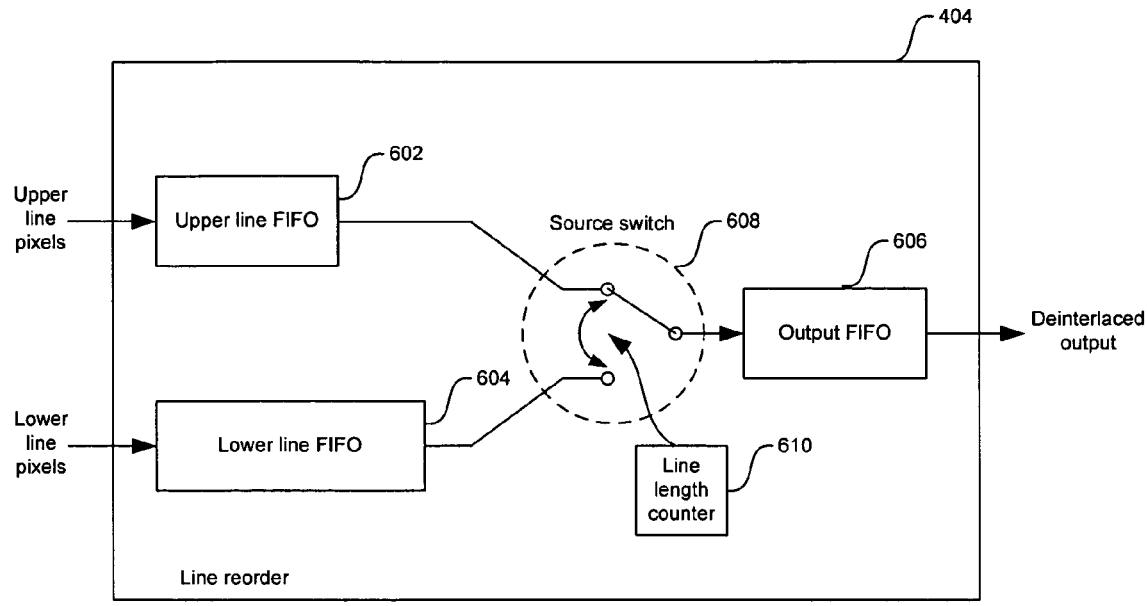
FIG. 6A-6B illustrate exemplary block diagrams of a line reorder that may be utilized in connection with a multi-field deinterlacer, in accordance with an embodiment of the invention.
Figure 6B:
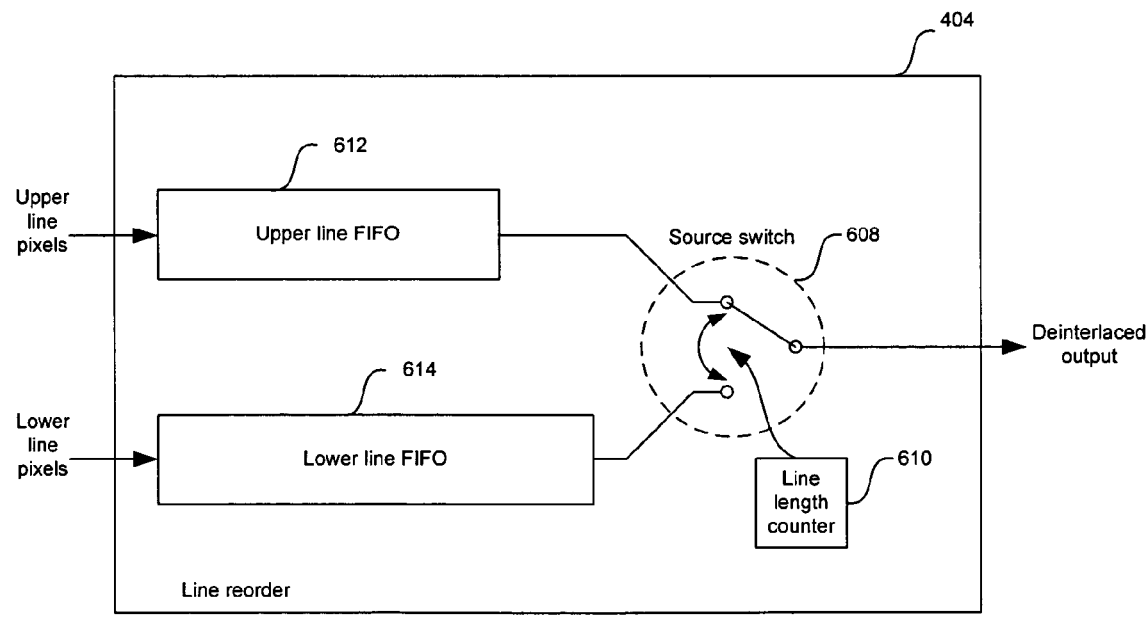

FIG. 6A-6B illustrate exemplary block diagrams of a line reorder that may be utilized in connection with a multi-field deinterlacer, in accordance with an embodiment of the invention. Referring to FIG. 6A, the line reorder 404 may comprise an upper line FIFO 602, a lower line FIFO 604, an output FIFO 606, a source switch 608, and a line length counter 610. In an exemplary enablement of the invention, the line reorder 404 may be adapted to take two vertically adjacent pixels at 480 interlaced (480i) rate from the pixel computation 402 and buffer them so that two lines may be output sequentially at 480 progressive (480p) rate. The upper line FIFO 602 may comprise suitable logic, code, and/or circuitry that may be adapted to buffer pixels from a line vertically above the lower line FIFO 604. The upper line FIFO 602 may be, for example, an embedded DRAM. The lower line FIFO 604 may comprise suitable logic, code, and/or circuitry that may be adapted to buffer pixels from a line vertically below the upper line FIFO 602. The lower line FIFO 604 may be, for example, an embedded DRAM.

The source switch 608 may comprise suitable logic, code, and/or circuitry that may be adapted to select between extracting or reading pixels from the upper line FIFO 602 or the lower line FIFO 604. Accordingly, pixels may be extracted by the source switch 608 from the upper line FIFO 602 before they are extracted from the lower line FIFO 604 at the start of a picture. The line length counter 610 may comprise suitable logic, code, and/or circuitry that may be adapted to count the number of pixels being extracted by the source switch 608 from either the upper line FIFO 602 or the lower line FIFO 604. When the number of pixels counted corresponds to a line length parameter for a deinterlaced output frame, the source switch 608 may switch to select pixels from the other FIFO.

The output FIFO 606 may comprise suitable logic, code, and/or circuitry that may be adapted to buffer the deinterlaced output frame assembled from the pixels in the upper line FIFO 602 and the lower line FIFO 604. The output FIFO 606 provides dataflow smoothing and may allow either the input and/or the output to be transferred through the deinterlacer averaged over the entire line time rather than being forced to sit idle during horizontal blanking followed by the higher (peak) data rate of the active line. The minimum size of the output FIFO 606 may be computed as follows:

$$\text{MIN\_OUTPUT\_FIFO\_SIZE} = (\text{peak\_rate} - \text{average\_rate}) \times \text{burst\_duration}$$
$$= \left(1 - \left(\frac{720}{858}\right)\right) \times 720$$
$$= 115.8$$

where the peak_rate is the peak transfer rate normalized to 1, the average_rate is the ratio between the number of active pixels in the line and the total pixels in the line, and the burst_duration is the number of active pixels to transfer during a data burst. In this case, the output FIFO 606 may buffer a minimum of 116 pixels, or 232 bytes for an 8-bit 4:2:2 system, where one byte may be for luma information and one byte may be for chroma information.

Referring to FIG. 6B, in another embodiment of the invention, the buffering provided by the output FIFO 606 in FIG. 6A may be provided by the upper line FIFO 612 and the lower line FIFO 614. In this case, the upper line FIFO 612 may comprise the buffering capacity of the output FIFO 606 added to the buffering capacity of the upper line FIFO 602. Similarly, the lower line FIFO 614 may comprise the buffering capacity of the output FIFO 606 added to the buffering capacity of the lower line FIFO 614.

Figure 7A:
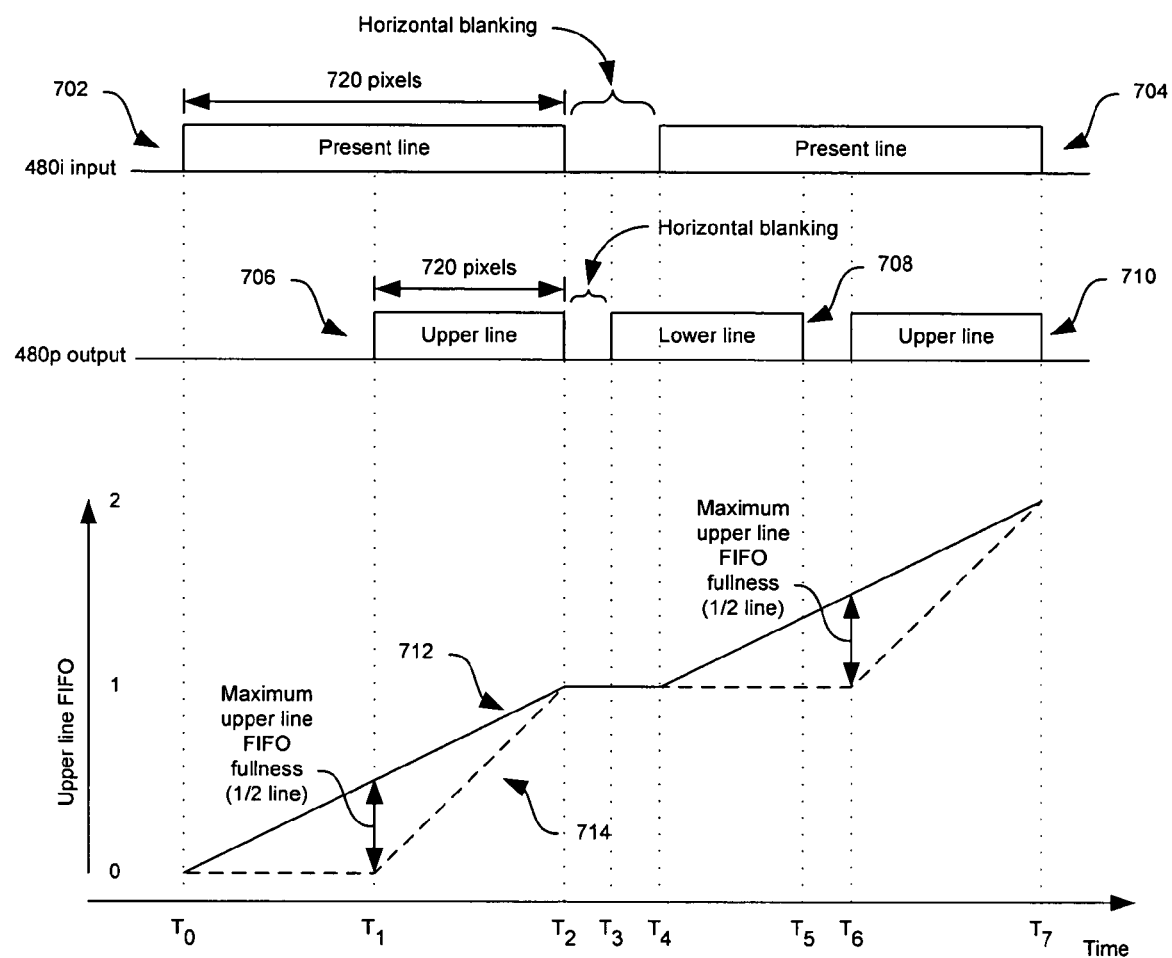
FIG. 7A illustrates an exemplary operation of the upper line FIFO, in accordance with an embodiment of the invention.

FIG. 7A illustrates an exemplary operation of the upper line FIFO, in accordance with an embodiment of the invention. Referring to FIG. 7A, a present line 702 may be the first line of an input field from a 480i source. A present line 704 may be representative of each subsequent line in the input field until the end of the field is reached. The present line 702 and the present line 704 may be separated by the horizontal blanking of the 480i source. An upper line 706 may be the first output line in a 480p output from a deinterlacer. The lower line 708 may be the subsequent line in the 480p output. The upper line 706 and the lower line 708 may be separated by the horizontal blanking of the 480p output.

In this illustrative example, at time instance $T_0$, the upper line FIFO 602 is empty. The upper line FIFO input 712 (solid line) corresponds to upper line pixels to be buffered by the upper line FIFO 602. The upper line FIFO output 714 (dashed line) corresponds to buffered pixels in the upper line FIFO 602 selected by the source switch 608 to form the 480p output or deinterlaced output frame. The upper line FIFO 602 may begin to buffer pixels that correspond to the present line 702 until the present line 702 ends at time instance $T_2$. At time instance $T_4$, after the horizontal blanking between present lines for the 480i input, the upper line FIFO 602 may begin to buffer pixels that correspond to the present line 704 until the present line 704 ends at time instance $T_7$. At time instance $T_1$, the source switch 608 may begin to select pixels from the upper line FIFO 602 to form the upper line 706 until the last pixel for the upper line 706 is selected at time instance $T_2$. Similarly, at time instance $T_6$, the source switch 608 may begin to select pixels from the upper line FIFO 602 to form the upper line 710 until the last pixel for the upper line 710 is selected at time instance $T_7$. The difference between the upper line FIFO input 712 and the upper line FIFO output 712 at time instances $T_1$ and $T_6$ indicates that the upper line FIFO 602 may not need to buffer more than half a video line during operation.

Figure 7B:
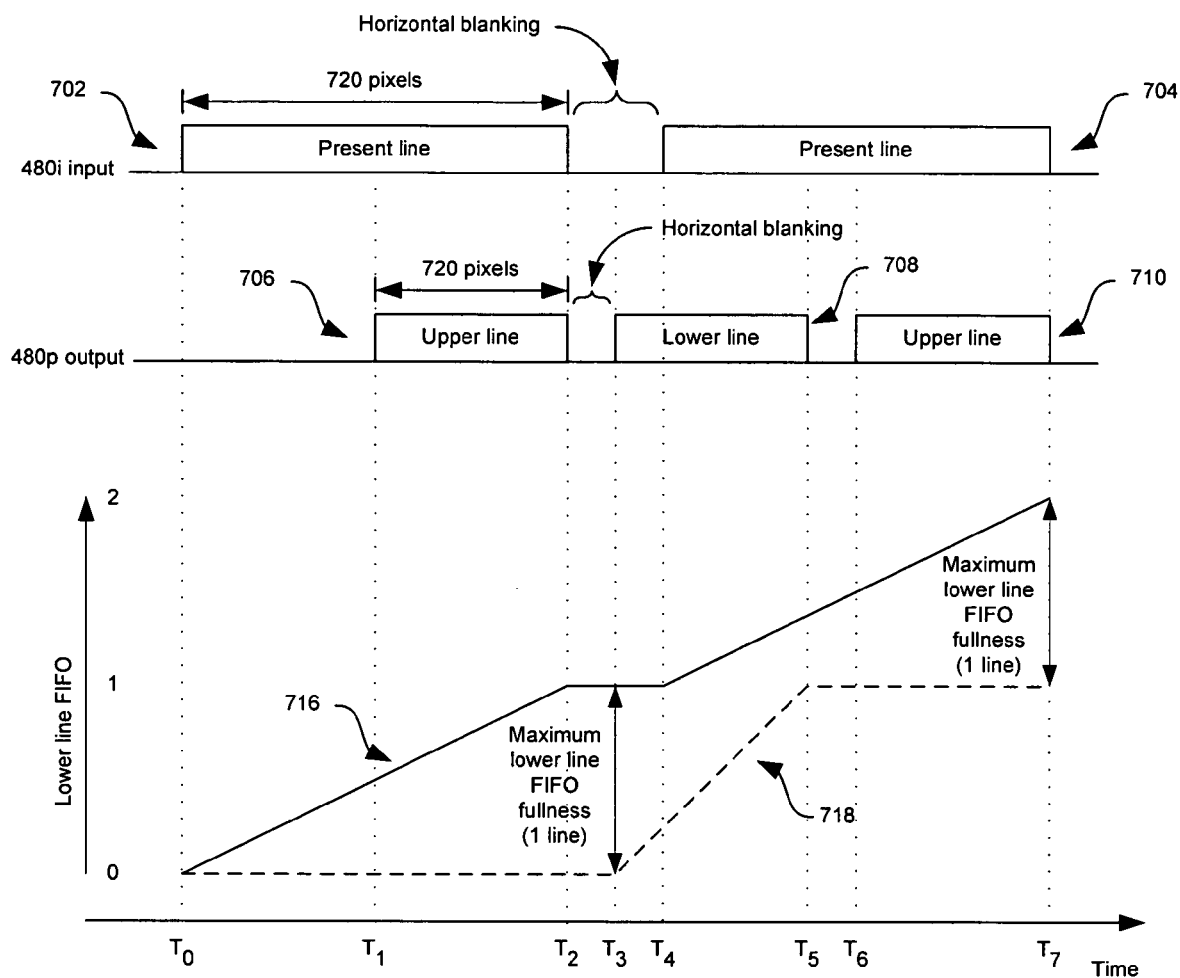
FIG. 7B illustrates an exemplary operation of the lower line FIFO, in accordance with an embodiment of the invention.

FIG. 7B illustrates an exemplary operation of the lower line FIFO, in accordance with an embodiment of the invention. Referring to FIG. 7B, at time instance $T_0$, the lower line FIFO 604 is empty. The lower line FIFO input 716 (solid line) corresponds to lower line pixels to be buffered by the lower line FIFO 604. The lower line FIFO output 718 (dashed line) corresponds to buffered pixels in the lower line FIFO 604 selected by the source switch 608 to form the 480p output or deinterlaced output frame. The lower line FIFO 604 may begin to buffer pixels that correspond to the present line 702 until the present line 702 ends at time instance $T_2$. At time instance $T_4$, after the horizontal blanking between present lines for the 480i input, the lower line FIFO 604 may begin to buffer pixels that correspond to the present line 704 until the present line 704 ends at time instance $T_7$. At time instance $T_3$, after the upper line 706 has been selected, the source switch 608 may begin to select pixels from the lower line FIFO 604 to form the lower line 708 until the last pixel for the lower line 708 is selected at time instance $T_5$. The difference between the lower line FIFO input 716 and the lower line FIFO output 718 at time instances $T_3$ and $T_7$ indicates that the lower line FIFO 604 may not need to buffer more than a video line during operation.

By buffering the upper line pixels and lower line pixels when assembling the deinterlaced output, a multi-field deinterlacer may reduce on-chip memory, reduce peak DRAM bandwidth requirements, and smooth out dataflow.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for video signal processing, the method comprising:
   buffering a plurality of upper line pixels and a plurality of lower line pixels, wherein said upper line pixels or said lower line pixels comprise an absent line generated in a motion adaptive deinterlacer;
   ordering said buffered plurality of upper line pixels and said buffered plurality of lower line pixels; and
   generating a deinterlaced output frame from said ordered buffered plurality of upper line pixels and said ordered buffered plurality of lower line pixels.

2. The method according to claim 1, comprising buffering said plurality of upper line pixels for a half video line.

3. The method according to claims 1, comprising buffering said plurality of lower line pixels for a video line.

4. The method according to claim 1, comprising generating a plurality of present line pixels and a plurality of absent line pixels.

5. The method according to claim 1, comprising ordering said buffered plurality of upper line pixels by selecting N of said buffered plurality of upper line pixels, wherein N corresponds to a line length of said deinterlaced output frame.

6. The method according to claim 1, comprising ordering said buffered plurality of lower line pixels by selecting N of said buffered plurality of lower line pixels, wherein N corresponds to a line length of said deinterlaced output frame.

7. The method according to claim 1, comprising generating said deinterlaced output frame by alternatively selecting between N of said buffered plurality of upper line pixels and N of said buffered plurality of lower line pixels, wherein N corresponds to a line length of said deinterlaced output frame.

8. The method according to claim 1, comprising buffering said plurality of upper line pixels for a half video line.

9. The method according to claim 1, comprising buffering said plurality of lower line pixels for a video line.

10. A machine-readable storage having stored thereon, a computer program having at least one code section for video signal processing, the at least one code section being executable by a machine for causing the machine to perform steps comprising:
    buffering a plurality of upper line pixels and a plurality of lower line pixels, wherein said upper line pixels or said lower line pixels comprise an absent line generated in a motion adaptive deinterlacer;
    ordering said buffered plurality of upper line pixels and said buffered plurality of lower line pixels; and
    generating a deinterlaced output frame from said ordered buffered plurality of upper line pixels and said ordered buffered plurality of lower line pixels.

11. The machine-readable storage according to claim 10, comprising code for generating a plurality of present line pixels and a plurality of absent line pixels.

12. The machine-readable storage according to claim 10, comprising code for ordering said buffered plurality of upper line pixels by selecting N of said buffered plurality of upper line pixels, wherein N corresponds to a line length of said deinterlaced output frame.

13. The machine-readable storage according to claim 10, comprising code for ordering said buffered plurality of lower line pixels by selecting N of said buffered plurality of lower line pixels, wherein N corresponds to a line length of said deinterlaced output frame.

14. The machine-readable storage according to claim 10, comprising code for generating said deinterlaced output frame by alternatively selecting between N of said buffered plurality of upper line pixels and N of said buffered plurality of lower line pixels, wherein N corresponds to a line length of said deinterlaced output frame.

15. A system for video signal processing, the system comprising:
    a pixel processor that buffers a plurality of upper line pixels and a plurality of lower line pixels, wherein said upper line pixels or said lower line pixels comprise an absent line generated in a motion adaptive deinterlacer;
    said pixel processor orders said buffered plurality of upper line pixels and said buffered plurality of lower line pixels; and
    said pixel processor generates a deinterlaced output frame from said ordered buffered plurality of upper line pixels and said ordered buffered plurality of lower line pixels.

16. The system according to claim 15, wherein said pixel processor comprises a pixel computation.

17. The system according to claim 16, wherein said pixel computation generates a plurality of present line pixels and a plurality of absent line pixels.

18. The system according to claim 15, wherein said pixel processor comprises a line reorder.

19. A method for video signal processing, the method comprising: buffering a plurality of upper line pixels and a plurality of lower line pixels;
    ordering said buffered plurality of upper line pixels and said buffered plurality of lower line;
    generating a deinterlaced output frame from said ordered buffered plurality of upper line pixels and said ordered buffered plurality of lower line pixels; and
    generating a plurality of present line pixels and a plurality of absent line pixels after cross chrominance removal.

20. A method for video signal processing, the method comprising:
    buffering a plurality of upper line pixels and a plurality of lower line pixels;
    ordering said buffered plurality of upper line pixels and said buffered plurality of lower line;
    generating a deinterlaced output frame from said ordered buffered plurality of upper line pixels and said ordered buffered plurality of lower line pixels;
    generating a plurality of present line pixels and a plurality of absent line pixels; and
    transferring said plurality of present line pixels to said plurality of lower line pixels and said plurality of absent line pixels to said plurality of upper line pixels when said deinterlaced output frame is originated from a bottom field.

21. A method for video signal processing, the method comprising:
    buffering a plurality of upper line pixels and a plurality of lower line pixels;
    ordering said buffered plurality of upper line pixels and said buffered plurality of lower line;
    generating a deinterlaced output frame from said ordered buffered plurality of upper line pixels and said ordered buffered plurality of lower line pixels;
    generating a plurality of present line pixels and a plurality of absent line pixels; and
    transferring said plurality of present line pixels to said plurality of upper line pixels and said plurality of absent line pixels to said plurality of lower line pixels when said deinterlaced output frame is originated from a top field.

22. A machine-readable storage having stored thereon, a computer program having at least one code section for video signal processing, the at least one code section being executable by a machine for causing the machine to perform steps comprising:

buffering a plurality of upper line pixels and a plurality of lower line pixels;

ordering said buffered plurality of upper line pixels and said buffered plurality of lower line pixels;

generating a deinterlaced output frame from said ordered buffered plurality of upper line pixels and said ordered buffered plurality of lower line pixels; and generating a plurality of present line pixels and a plurality of absent line pixels after cross chrominance removal.

23. A machine-readable storage having stored thereon, a computer program having at least one code section for video signal processing, the at least one code section being executable by a machine for causing the machine to perform steps comprising:

buffering a plurality of upper line pixels and a plurality of lower line pixels;

ordering said buffered plurality of upper line pixels and said buffered plurality of lower line pixels;

generating a deinterlaced output frame from said ordered buffered plurality of upper line pixels and said ordered buffered plurality of lower line pixels;

generating a plurality of present line pixels and a plurality of absent line pixels; and transferring said plurality of present line pixels to said plurality of lower line pixels and said plurality of absent line pixels to said plurality of upper line pixels when said deinterlaced output frame is originated from a bottom field.

24. A machine-readable storage having stored thereon, a computer program having at least one code section for video signal processing, the at least one code section being executable by a machine for causing the machine to perform steps comprising:

buffering a plurality of upper line pixels and a plurality of lower line pixels;

ordering said buffered plurality of upper line pixels and said buffered plurality of lower line pixels;

generating a deinterlaced output frame from said ordered buffered plurality of upper line pixels and said ordered buffered plurality of lower line pixels;

generating a plurality of present line pixels and a plurality of absent line pixels; and transferring said plurality of present line pixels to said plurality of upper line pixels and said plurality of absent line pixels to said plurality of lower line pixels when said deinterlaced output frame is originated from a top field.

25. A system for video signal processing, the system comprising:

a pixel processor that buffers a plurality of upper line pixels and a plurality of lower line pixels;

said pixel processor orders said buffered plurality of upper line pixels and said buffered plurality of lower line pixels; and said pixel processor generates a deinterlaced output frame from said ordered buffered plurality of upper line pixels and said ordered buffered plurality of lower line pixels;

said pixel processor comprises a pixel computation that generates a plurality of present line pixels and a plurality of absent line pixels; and said pixel computation transfers said plurality of present line pixels to said plurality of lower line pixels and said plurality of absent line pixels to said plurality of upper line pixels when said deinterlaced output frame is originated from a bottom field.

26. A system for video signal processing, the system comprising:

a pixel processor that buffers a plurality of upper line pixels and a plurality of lower line pixels;

said pixel processor orders said buffered plurality of upper line pixels and said buffered plurality of lower line pixels; and said pixel processor generates a deinterlaced output frame from said ordered buffered plurality of upper line pixels and said ordered buffered plurality of lower line pixels;

said pixel processor comprises a pixel computation that generates a plurality of present line pixels and a plurality of absent line pixels; and said pixel computation transfers said plurality of present line pixels to said plurality of upper line pixels and said plurality of absent line pixels to said plurality of lower line pixels when said deinterlaced output frame is originated from a top field.

27. A system for video signal processing, the system comprising:

a pixel processor that buffers a plurality of upper line pixels and a plurality of lower line pixels;

said pixel processor orders said buffered plurality of upper line pixels and said buffered plurality of lower line pixels; and said pixel processor generates a deinterlaced output frame from said ordered buffered plurality of upper line pixels and said ordered buffered plurality of lower line pixels; and said pixel processor comprises a line reorder that generates said deinterlaced output frame by alternatively selecting between N of said buffered plurality of upper line pixels and N of said buffered plurality of lower line pixels, wherein N corresponds to a line length of said deinterlaced output frame.

28. A system for video signal processing, the system comprising:

a pixel processor that buffers a plurality of upper line pixels and a plurality of lower line pixels;

said pixel processor orders said buffered plurality of upper line pixels and said buffered plurality of lower line pixels; and said pixel processor generates a deinterlaced output frame from said ordered buffered plurality of upper line pixels and said ordered buffered plurality of lower line pixels; and said pixel processor comprises a line reorder that comprises an upper line FIFO, a lower line FIFO, a source switch, and a line length counter.

29. The system according to claim 28, wherein said upper line FIFO buffers said plurality of upper line pixels for a half video line.

30. The system according to claim 28, wherein said lower line FIFO buffers said plurality of lower line pixels for a video line.

31. The system according to claim 28, wherein said source switch selects N of said buffered plurality of upper line pixels, wherein N corresponds to a line length of said deinterlaced output frame.

32. The system according to claim 28, wherein said source switch selects N of said buffered plurality of lower line pixels, wherein N corresponds to a line length of said deinterlaced output frame.

33. The system according to claim 28, wherein said line length counter counts a number N of pixels, wherein N corresponds to a line length of said deinterlaced output frame.

* * * * *